Sept. 26, 1950      R. FEITL      2,523,463
SLIDE FASTENER MANUFACTURE AND MOLD THEREFOR
Filed Oct. 13, 1947      2 Sheets-Sheet 1

*INVENTOR.*
RUDOLF FEITL,
BY
ATTORNEY

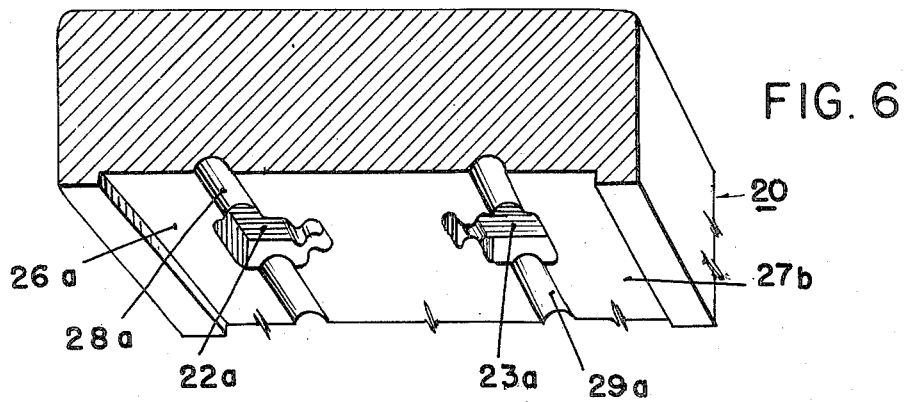
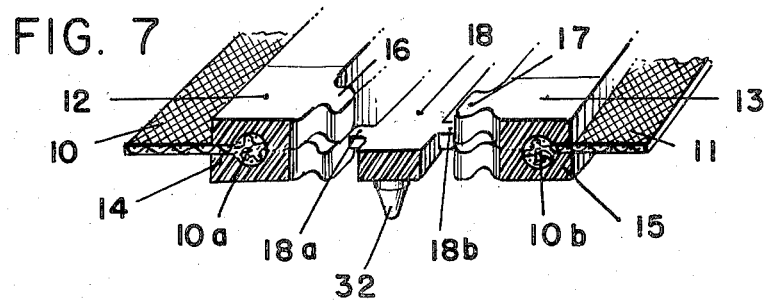
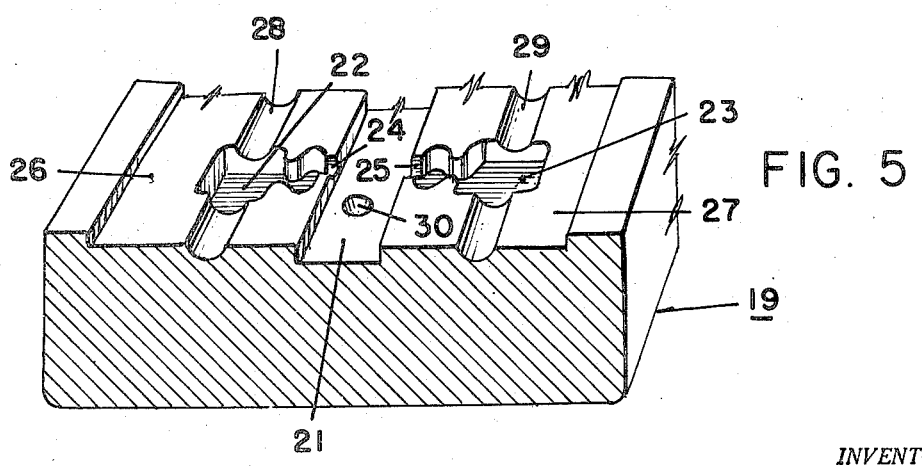

Patented Sept. 26, 1950

2,523,463

UNITED STATES PATENT OFFICE 2,523,463

SLIDE FASTENER MANUFACTURE AND MOLD THEREFOR

Rudolf Feitl, Brooklyn, N. Y., assignor to Waldes Kohinoor, Inc., Long Island City, N. Y., a corporation of New York Application October 13, 1947, Serial No. 779,595

6 Claims. (Cl. 18—36)

This invention relates to improvements in slide fastener manufacture, and more particularly to an improved method of and apparatus for manufacturing slide fasteners of the plastic type to any desired length.

As is generally known in the art, a slide fastener chain comprises two rows of oppositely disposed interlocking elements which are attached at their one ends to the beaded edges of longitudinally extending tapes, the elements having at their free ends coupling portions, i. e. projections and corresponding recesses, by means of which the elements of one row, which are staggered with reference to the elements of the opposite row, interengage with the latter elements. The fastener chain is opened and closed by a slider which disengages the elements of one row from those of the opposite row when moved in one direction, and interlocks them when moved in the opposite direction.

Slide fasteners of the plastic type which are made, for example, from nylon or other suitable thermoplastic material are preferably molded in a two-part pressure mold by injecting the plastic material into a longitudinal channel or groove formed by the mold parts, from whence it is distributed through small ports or gates to appropriate side cavities provided by the mold parts which are adapted to form the rows of single elements of a slide fastener chain. After injection, and upon pressing of the mold parts together, there is formed a continuous "ladder", consisting of two rows of elements secured to a lengthwise middle strip, corresponding to the longitudinal distributing channel of the mold into which the plastic material has been injected, by means of tiny connections extending from the side edges of the strip to the elements disposed to both sides thereof.

Preferably, the elements—or more properly the complete "ladder" thereof as described—are directly cast upon the tapes, in contrast to earlier processes in which the elements were cast first and subsequently attached to the tapes in a separate operation, or cast to the tapes singly. Accordingly, the two tapes on which the elements are to be arranged are laid lengthwise in appropriate channels provided in the mold for their reception and, during the mold pressing operation, the injected material penetrates into the porous material of the tapes, or the tapes are conventionally provided with beaded edges and the injected material is cast around said edges, so that the elements are held on the tape as in any ordinary slide fastener. In either case, the two oppositely arranged stringers constituting the fastener chain are provided with coupling elements for their entire length in a single molding operation, and manufacture can be effected at high speed.

Fastener chains as aforesaid are usually made up in certain lengths according to a customer's specifications, such lengths being successively molded on continuous tapes and spaced by short or skip-length portions of tapes which are devoid of elements. No difficulties arise in making up the chains when the specified length thereof corresponds to the length of the mold since the distance between the last elements of one molded length to the first or forward elements of the next following length of chain being molded is not critical in such a case. For example, if the mold has a length of 12", and a 12" fastener chain is desired, it is relatively simple for the operator to move the tape forwardly after each molding by the amount that the stringers of the chain are to be spaced from one another, i. e. by that part of the tapes which is free of the elements. However, difficulties do arise when a fastener chain of multiple unit length, say two or three times the length of the mold, or a chain of indefinite length, is required. In such a case, it is imperative that the last element of one molded length and the first element of the following molded length are exactly spaced, by the exact pitch distance required between all the elements, it being obvious that a different spacing of any two successive fastener elements may impair the functioning of the fastener as a whole since proper functioning thereof depends on the exact interengaging of the coupling parts of the elements. Thus, it becomes clear that if a unit length of chain resulting from a molding operation is 12", and a chain of 24" or 36", for example, or a chain of 18" or 30", or a chain of indefinite length is wanted, the distance between the last or rearward elements of each preceding 12" length of chain and the first or forward elements of each succeeding length thereof becomes critical. Heretofore, this critical distance was only estimated, and much time and unusual skill on the part of the operator was necessary. Even then, the result proved doubtful and frequently was not satisfactory.

It is an object of the present invention to overcome the above-noted difficulty of manufacturing slide fastener chains of greater than unit length by providing a simple and exceedingly practical method of making a slide fastener chain to any multiple unit length desired, by which exact spacing between the last elements of any one unit length of chain and the first or forward elements of a succeeding length is achieved quickly and without any special skill on the part of the operator, thus materially speeding up the manufacturing process. It is also an object of the invention to provide improved and simple means by which the new method may be practiced.

A further object of the invention is the provision of a method of and apparatus for making slide fastener chains to desired length by forming the stringers making up the chain in a succession of molding operations, each resulting in the production of a unit length of chain provided with forward and rearward end markings corresponding to similar markings formed in or provided at the ends of the molds, and which are so located that when the rearward marking of one unit length of chain is shifted to coincide with the marking of the forward end of the mold, the next molding must of necessity result in a unit length of chain whose elements are correctly spaced from the prior molded unit length thereof.

Another object of the invention is the provision of a method of and apparatus for making multiple-unit lengths of slide fastener chains in a single-unit length of mold, according to which each unit length of fastener is formed in the molding thereof with dowels or projections adapted to fit into corresponding recesses provided in at least one part of the mold, said dowels and recesses providing piloting means for molding each succeeding length of fastener in properly spaced relation from each preceding molded length thereof, whereby the fastener elements between successively molded unit lengths of the fastener chain have the same pitch distance as any other two elements thereof:

The improved process of manufacturing slide fasteners according to the invention, and the preferred means for practicing this process, will be more clearly understood from the following detailed description thereof taken with the accompanying drawings, in which—

Figs. 5 and 6 are enlarged broken-away perspective views of the two mold parts; and Fig. 7 is a perspective view showing a short length of molded chain as produced by the mold portions shown in Figs. 5 and 6.

Figure 1:
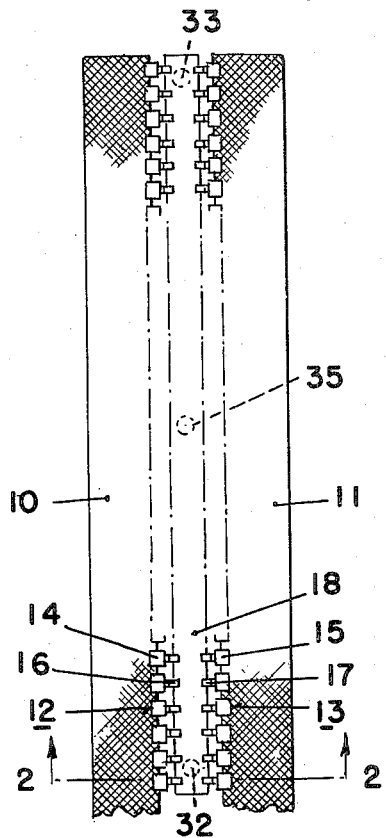
Fig. 1 is a partially diagrammatic plan view of a molded unit-length of slide fastener chain according to the invention.

In the drawings, reference numerals 10 and 11 designate the two longitudinal fabric tapes of a slide fastener chain to the adjacent edges of which the interengaging elements 12 and 13 are attached at their jaw ends 14, 15, the free ends of the elements extending beyond the tape edges to form the coupling parts 16, 17. Inasmuch as the special form to which the coupling parts of the elements must be molded form no part of the present invention, further detailed description thereof is not believed necessary.

Figure 3:
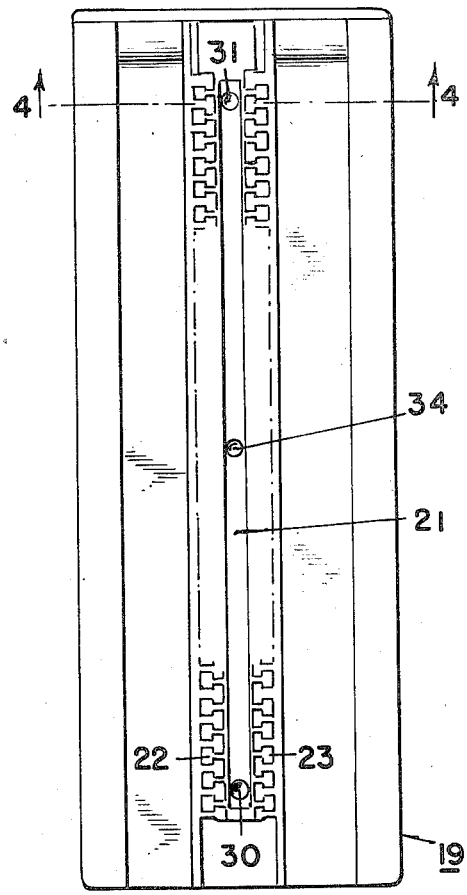
Fig. 3 is a plan view of one of the mold parts employed in carrying out the invention.
Figure 2:
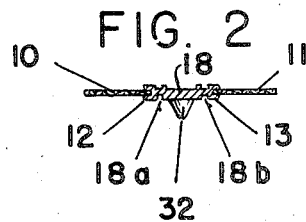
Fig. 2 is a section along line 2—2 of Fig. 1.
Figure 4:
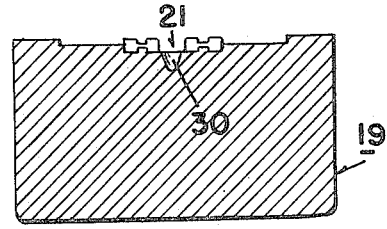
Fig. 4 is a section taken along line 4—4 of Fig. 3.

Referring to Figs. 3 and 4, illustrating in plan and section, respectively, one part 19 of a two-part mold 19, 20 employed in making up the stringer illustrated in Fig. 1, reference numeral 21 designates a longitudinal mold channel into which the plastic material is injected and from whence it is distributed to element-forming recesses 22, 23, which shape the elements, through the small ports or gates 24, 25 which are best seen in Fig. 5, the other mold part 20 (Fig. 6) being also provided with complementary recesses 22a, 23a for forming the elements. Both mold parts are further provided with complementary longitudinal side channels or grooves 26, 27 and 26a, 27a to accommodate the tapes 10 and 11, and with longitudinally extending, half-round channels 28, 29 and 28a, 29a for the reception of the beads 10a, 11a, (Fig. 7) with which the adjacent edges of the tapes are conventionally provided. It will be observed from Fig. 6 that the mold part 20 is devoid of any counterpart channel corresponding to that numbered 21 of the mold part 19.

Upon the plastic material being injected into the central or distributing channel 21 of the assembled mold and the two mold halves pressed together, there is formed a continuous "ladder" or double row of interlocking elements 12, 13 extending laterally from a plastic middle strip 18 (Figs. 1 and 7) to which the elements are connected by small connecting webs 18a, 18b. With the jaw ends 14, 15 of the elements being cast on and hence tightly embracing the beads of the tapes, it will be seen that the elements are firmly attached thereto. The small connecting webs 18a, 18b are sufficiently frangible so that together with the middle strip 18 they may readily be broken away from the elements proper, so that there remains a pair of tapes with interlocking elements attached, constituting the two stringers of a slide fastener chain, ready to be assembled in a finished slide fastener.

Each mold is usually dimensioned to make up a certain unit-length of slide fastener chain, for example, 12". When it is desired to make a fastener chain of twice or three times that length, or a chain of indefinite length, the aforesaid molding operations have to be repeated several times in succession on the same tapes, which are shifted forwardly relative to mold following each molding operation to present fresh lengths of tape to the mold. As already explained above, for proper functioning of the fastener, the pitch distance of the elements between successive unit lengths of chain must be identical with the pitch distance between any other two successive elements of the chain.

According to the invention and to insure the required exact and accurate spacing between the end elements of adjacent unit lengths of chain, the central strip 18 of each unit length is marked during its molding both at its forward and rear ends in accordance with markings provided in or on the ends of at least one mold part. Thus, when one finished unit length of chain is shifted forward in the mold, the marking at the rear end thereof which had previously coincided with the marking at the rear end of the mold will eventually coincide with the marking provided at the forward end of the mold. By spacing the aforesaid mold markings the exact amount that a molded length of stringer must be shifted forwardly relative to mold to insure exact pitch spacing between the rearward elements of one molded length thereof and the forward elements of the next succeeding length, it becomes obvious that the difficulty heretofore encountered in estimating the spacing between the adjacent end elements of successive unit lengths of chain is entirely overcome, and that the desirable accurate spacing may be very simply achieved.

The markings provided at the ends of each unit length of chain in the preferred embodiment of the invention take the form of dowel-like projections which are formed at the ends of the middle strip 18 with which the chain is initially formed in the molding of the chain as a whole. For this purpose, preferably the mold part 19 is provided with end recesses 30, 31 (Figs. 3 and 5) which results in the formation of the aforesaid dowel-like projections 32, 33 (Figs. 1 and 7) at the ends of the middle strip. It becomes evident that following the molding of a unit length of chain and the shifting thereof relative to the mold until the rearward projection 32 formed in the rearward mold recess 30 seats in the forward mold recess 30, the next unit length of stringer must of necessity have the required exact spacing from the preceding length thereof.

To provide for the manufacture of a fastener chain having a length greater than that of the mold by a fraction thereof, for example, one-and-a-half times the length of the mold, the recess 34 may be provided as shown at the midpoint of the mold, which forms a projection 35 on the middle strip of the molded chain. Thus a unit length of chain following molding thereof may be shifted forwardly for half the distance of its length by coinciding its rearward and mid-length projections 32 and 35 with the forward and mid-point recesses 31, 34 of the mold.

Preferably, the mold recesses 30, 31 and 34 and hence the complemental projections 32, 33 and 35 are tapered, since this shape makes it especially easy for the operator to seat the molded projections into the corresponding mold recesses. The tapering aforesaid is also of advantage in that, when the tapered projection is introduced into a complementally shaped mold recess, the projection automatically centers itself in the recess.

Without further analysis, it will be appreciated that the invention provides a simple yet effective and practical method and unit length mold for manufacturing slide fastener chains to multiple unit lengths as desired, with assurance that the adjacent end elements of successively molded unit sections or lengths of the chain are accurately spaced the required pitch distance between elements as is necessary for the proper functioning of a slide fastener. In addition, the manufacture of multiple unit lengths of slide fasteners by an injection molding process employing a unit length of mold is speeded up considerably and the aforesaid advantages achieved without the need or requirement of any special skill on the part of the operator.

While the invention has been described in its application to the manufacture of slide fasteners of the plastic type, i. e. made from thermoplastic material, it is also applicable to the manufacture of metallic slide fasteners which are die-cast in unit lengths which may be shorter than a customer's requirements.

As many changes could be made in carrying out the above construction without departing from the scope of the invention, it is intended that all matter contained in the above description or shown in the accompanying drawing shall be interpreted as illustrative and not in a limiting sense.

I claim:

1. The method of molding slide fastener chains to desired multiple-unit length in a mold of unit length and which is provided adjacent each of the rearward and forward ends of its central distributing channel with a recess, the rearward recess adapted to form a complemental projection at the rearward end of each unit length chain being molded and the forward recess being adapted for registering a rearward projection on a prior molded length of chain with a length to be molded, which includes the steps of molding a succession of chain "ladders" of unit length, each of said "ladders" consisting of double rows of fastener elements extending laterally from a middle strip extending longitudinally between said rows, simultaneously with each said molding operation forming a projection at the rearward end of said middle strip, and between each said molding operation shifting each prior molded length of chain forwardly relative to the mold by an amount such that the projection at the rearward end of said middle strip of each prior molded unit length of chain registers with the recess at the forward end of the mold, thereby to locate each succeeding unit length of chain in exact pitch distance to each prior molded length thereof.

2. The method of molding slide fastener chains as set forth in claim 1, wherein said mold recesses are tapered, and said projection formed at the rearward end of said middle strip of each "ladder" is correspondingly tapered.

3. The method of molding slide fastener chains consisting of longitudinal tapes provided along adjacent edges with rows of oppositely disposed fastener elements to a desired multiple-unit length in a mold of unit length provided with tape-receiving channels and a central distribution channel delivering to the element cavities and having a recess adjacent each of the rearward and forward ends of the distribution channel, the rearward recess adapted to form a complemental projection at the rear end of each unit length of chain being molded and the forward recess being adapted for registering a rearward projection on a prior molded length of chain with a length to be molded, which includes the steps of directly molding the elements to the tapes to form a chain "ladder" of unit length, said "ladder" consisting of double rows of fastener elements extending laterally from a middle strip extending longitudinally between said rows, simultaneously with said molding operation forming a projection at the rearward end of said middle strip complemental to the rearward recess of the mold, thereupon shifting said molded length of chain forwardly relative to the mold a predetermined amount such that the projection at the rearward end of said middle strip coincides with the recess at the forward end of the mold and that a required fresh length of tapes is drawn into the mold channels for the next molding operation, and repeating the aforesaid operations as required to make up the chain to the desired multiple-unit length.

4. The method of molding slide fastener chains as set forth in claim 3, wherein said mold recesses are tapered, and the projection formed at the rearward end of said middle strip is correspondingly tapered.

5. A mold for making plastic slide fastener chains to a desired length which is a multiple of the length of the mold, comprising mold halves provided with a longitudinally extending central distributing channel and side tape-receiving channels and with a plurality of fastener element-forming recesses communicating with the side channels and connected to the longitudinally extending channel by small area gates, the central distributing channel being formed at its ends with recesses which are spaced an amount corresponding to the exact unit length of chain and which are adapted to mold a projection on the chain for exactly locating a succeeding unit length thereof to be formed in the mold relative to a preceding molded unit length thereof.

6. A mold for making slide fastener chains as set forth in claim 5, wherein the recesses in the channel comprise tapered depressions capable of forming dowel-like tapered projections at the ends of each molded unit length of chain.

RUDOLF FEITL.

REFERENCES CITED

The following references are of record in the file of this patent:

UNITED STATES PATENTS

| Number | Name | Date |
|---|---|---|
| 2,368,260 | Morin | Jan. 30, 1945 |
| 2,424,047 | Morin | July 15, 1947 |
| 2,440,960 | Kuzmick | May 4, 1948 |

FOREIGN PATENTS

| Number | Country | Date |
|---|---|---|
| 361,092 | Great Britain | Nov. 19, 1931 |